United States Patent [19]

Boschetto

[11] Patent Number: 5,042,760
[45] Date of Patent: Aug. 27, 1991

[54] CARD HOLDER

[76] Inventor: Todd R. Boschetto, 13 Stayman La., Sewell, N.J. 08080

[21] Appl. No.: 523,550

[22] Filed: May 15, 1990

[51] Int. Cl.⁵ .............................................. F16M 11/00
[52] U.S. Cl. ...................................... 248/174; 248/152
[58] Field of Search ....................... 248/174, 152, 309.1

[56] References Cited

U.S. PATENT DOCUMENTS

| 1,047,882 | 12/1912 | Beach | 248/174 X |
| 1,091,026 | 3/1914 | Traugott | 248/174 X |
| 3,501,072 | 3/1970 | Kovener | 248/165 X |
| 4,150,752 | 4/1970 | Breining | 211/13 |
| 4,450,759 | 5/1984 | Steibel | 248/174 X |

FOREIGN PATENT DOCUMENTS

| 274036 | 5/1930 | Italy | 248/174 |
| 191877 | 1/1923 | United Kingdom | 248/174 |
| 1294663 | 11/1972 | United Kingdom | 248/174 |

Primary Examiner—Alvin C. Chin-Shue
Attorney, Agent, or Firm—Longacre & White

[57] ABSTRACT

A free standing holding for cards and/or trinkets. The holder is made from sheet members interfitted in a scissors manner to form a stable three dimensional structure with a locking system positioned between the interfitted members. The extended edges of the interfitting members include slots to hold cards or other articles for presentation.

15 Claims, 4 Drawing Sheets

CARD HOLDER

FIELD OF THE INVENTION

The invention relates to the field of free standing supports for articles. More specifically, the present invention relates to free standing holders for holding cards and other miscellaneous trinkets which are difficult to place.

BACKGROUND OF THE INVENTION

As long as man has been a collector or a recipient of cards, letters, trinkets, and other miscellaneous articles which can be displayed for purposes of decoration, the problem has existed as exactly how to store the articles, cards etc. for presentation purposes. Several ideas with respect to presentation have been advanced, and include various wall mounted hangers or holders, as well as several shelf type supports.

However, given the sporadic and usually seasonal receipt of most of these articles, i.e., christmas, birthdays, etc., the prospect of a wall mounted, or other semipermanent, hanger is not well conceived. Firstly, the wall or other mounting surface is scarred in some respect by the mounting hardware, and secondly, owing to the fact of seasonal receipt, one article holder or support may not suit the next season or article receipt occasion. Hence, another holder must be produced, hung, etc. All in all, the prior art systems are cumbersome and generally ill suited to sporadic or seasonal use.

The present invention is directed to solving the problems presented in the prior art by providing an easily erectable, pleasingly appearing, easily disassembleable and stored support.

SUMMARY OF THE INVENTION

The present invention is a holder or support for cards and/or other miscellaneous items which a person might collect or receive over a period of time. The holder according to the present invention is made of two or more intersecting structural elements which are locked into relative position. These elements interfit to form a free standing support which carries cards, etc., on the extending edge portions of the interfitting members.

The interfitting members can be as numerous as necessary depending on the scale or size of the holder desired. Further, the relatively stiff interfitting members can assume any desired profile shape, as long as in combination the interfitting members present a fairly stable support edge network to an underlying surface. The interfitting members can be shaped so as to correspond to a particular event, e.g., birthday balloons, or romantic flowers, or merely be an artistic rendering.

The material for the interfitting members can be selected from any suitably stiff material, e.g., cardboard, sheet metal, construction paper. In this manner, the invention can be provided in completed and stamped form, or in kit form for the end user to create and assemble, in virtually any targeted price range.

DETAILED DESCRIPTION OF THE INVENTION

Figure 1:
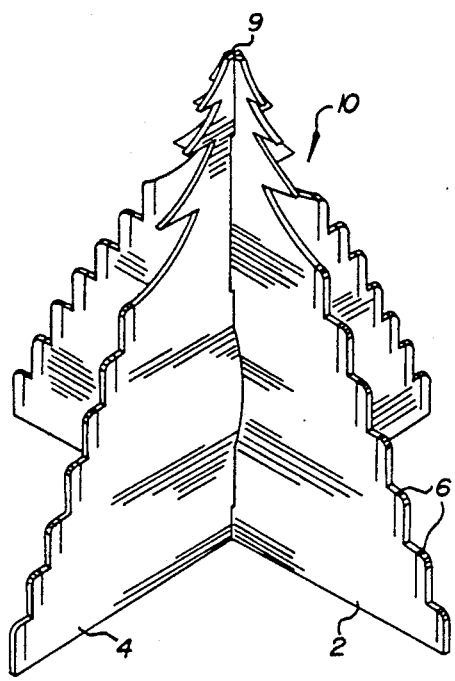
FIG. 1 is a perspective view of a holder according to the present invention shown in a christmas tree embodiment.
Figure 2:
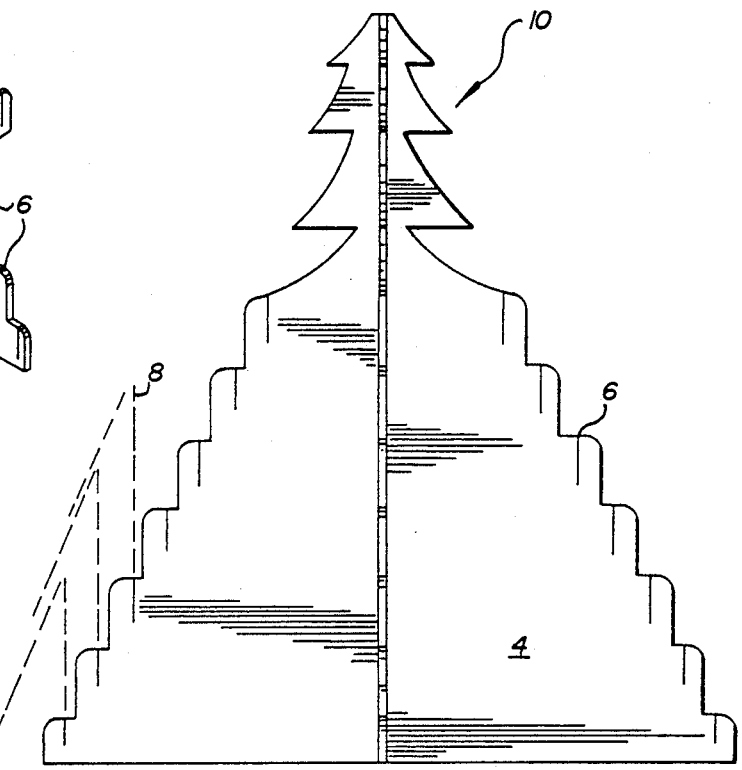
FIG. 2 is a right side view of a holder according to the present invention.
Figure 3:
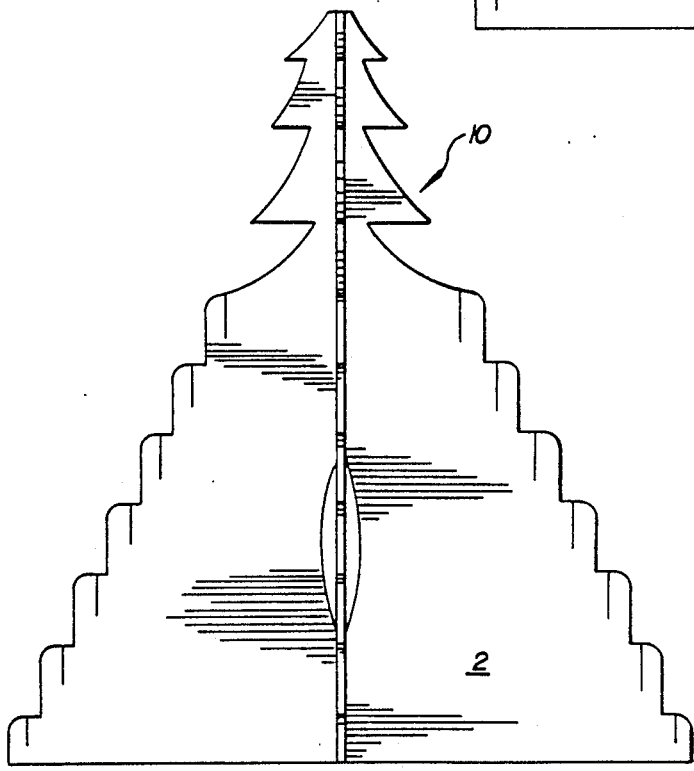
FIG. 3 is a rear side view of a holder according to the present invention.
Figure 4:
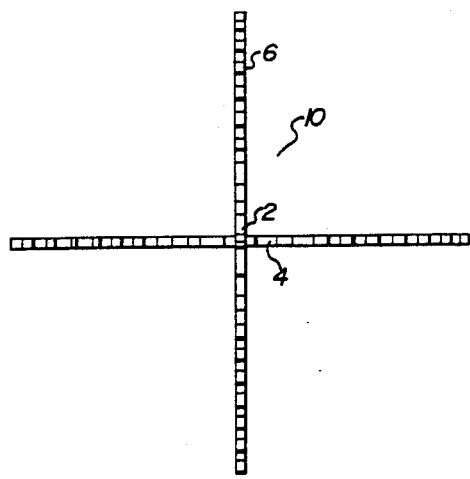
FIG. 4 is a top view of a holder according to the present invention.
Figure 5:
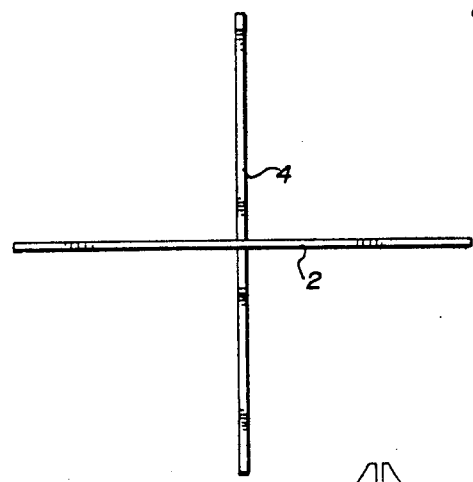
FIG. 5 is a bottom view of a holder according to the present invention.
Figure 6:
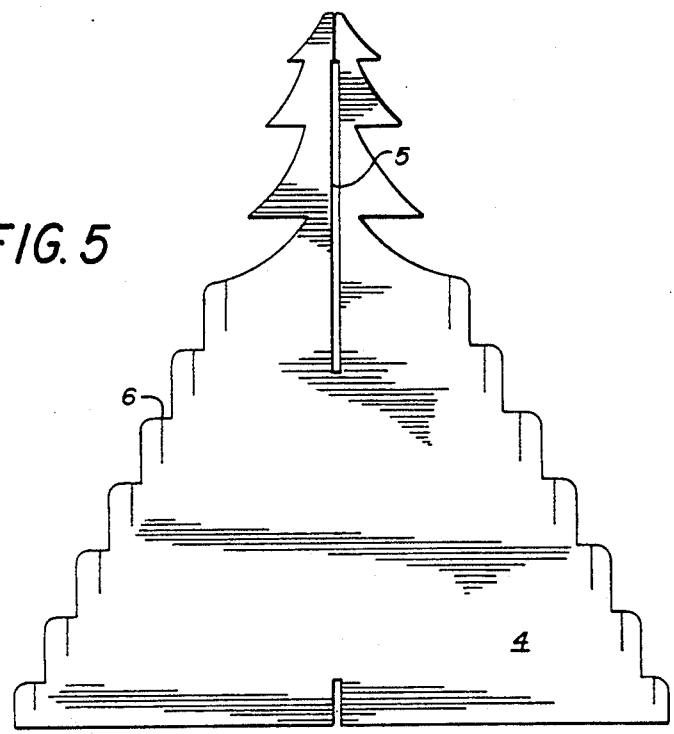
FIG. 6 is an elevational view of a bottom element of the interfitting elements which comprise the present invention.
Figure 7:
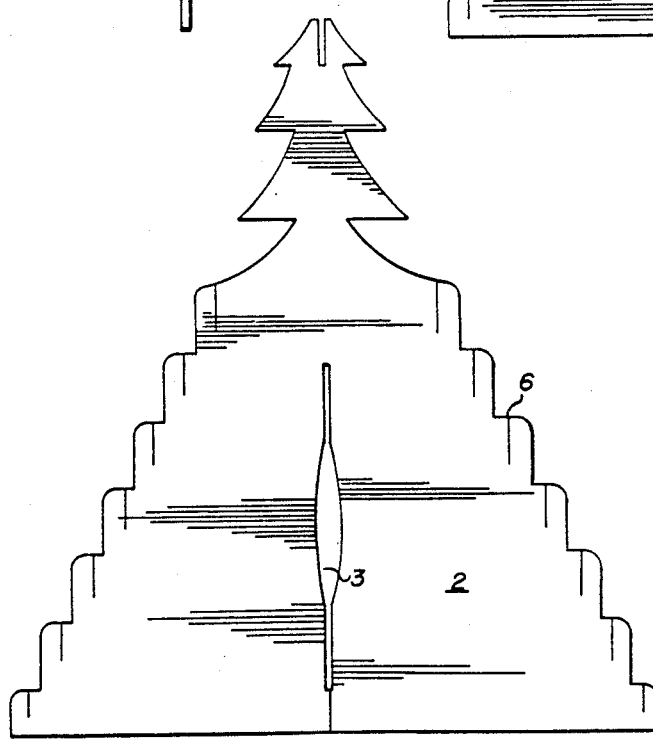
FIG. 7 is an elevational view of an upper element of the interfitting elements which comprise the present invention.
Figure 8:
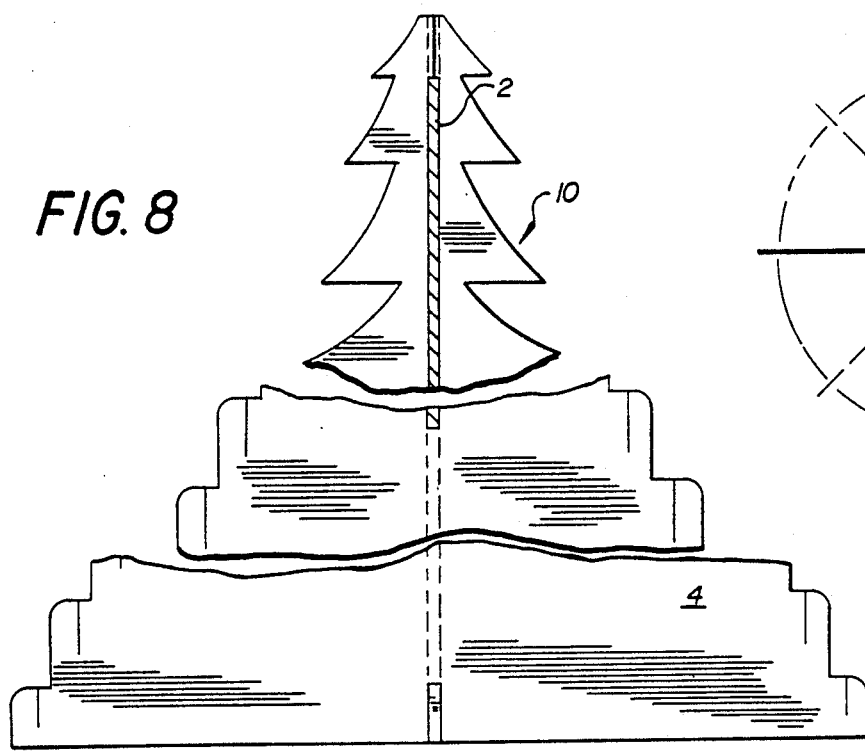
FIG. 8 is a sectional view of a holder according to the present invention wherein an upper element is shown in section.

With reference to the drawings figures herewith, the holder according to the present invention is described as follows.

The holder is labeled 10 in the drawing figures. Generally the holder is comprised of two or more interfitting members 2 and 4. These members interfit in a scissors manner from above and below to form a generally three dimensional shape which is capable of standing erect upon an underlying surface.

Figure 11:
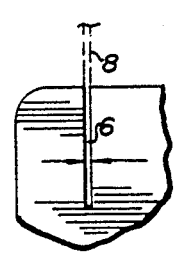
FIG. 11 is an enlarged view of a card support slot of the present invention as circle in FIG. 10.

The extending edges of the interfitting members include slots 6 for holding the cards 8 (shown in dashed lines) and or other articles in manner for presentation (see FIG. 11). The upper portion 9 of the combined interfitting members may include an additional slot or hook (not illustrated) which can accommodate attachment of a floating ornament, i.e., a helium balloon, or other desired crown piece for the holder structure.

Figure 12:
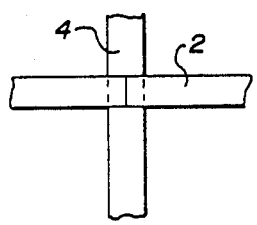
FIG. 12 is an enlarged view of the intersection of the interfitting members as viewed from beneath the holder.

The respective upper and lower sections, 2 and 4, of the holder herein illustrated include interfitting slots 3 and 5. The slots 3 and 5 cooperate so that the top and bottom sections can scissors and present a broad and stable network of lower surface edges of the respective sections 2 and 4 to an underlying surface (see FIG. 12). In this manner, the holder according to the present invention can accommodate a number of trinkets and/or cards along the extended lateral edges of members 3 and 4 without toppling over.

Figure 13:
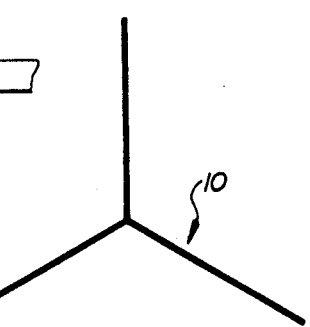
FIG. 13 is a top view of an alternative embodiment of a holder according to the present invention wherein the interfitting members are combined to form independent extending edge portions.

Although a christmas tree embodiment of the holder is disclosed, the respective top and bottom sections 2 and 4 of the holder may take on a variety of shapes and sizes, and may be provided in any desired number to satisfy a particular design requirement. For example the embodiment shown in FIG. 13 is a three spoke configuration, and can be comprised of either three separate interfitting members, or two interfitting members. In the case where two interfitting members are used, the larger of the members is creased into a 120 degree fold, and the other cooperating section member forms the third spoke via a scissors connection to the larger creased interfitting member. In the case where three interfitting members are used, the scissors connections between the respective members need merely accommodate, in the cooperating slots 3 and 5 of the respective interfitting members, three consecutively inserted members instead of two.

Figure 9:
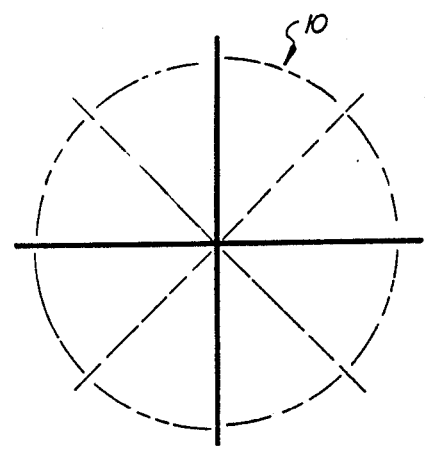
FIG. 9 is a top view of an alternative embodiment of the present invention wherein additional interfitting are used.

FIG. 9 illustrates the possibilities of configurations of a holder according to the present invention where a plurality of interfitting members are provided. The required number of members need only be equipped with respective scissor slots 3 and 5 of suitable dimension to accommodate the necessary number of consecutive interfitting members.

Figure 14:
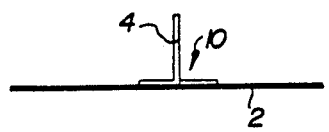
FIG. 14 is a top view of an alternative embodiment of the present invention wherein the respective interfitting members are of substantially different size.
Figure 10:
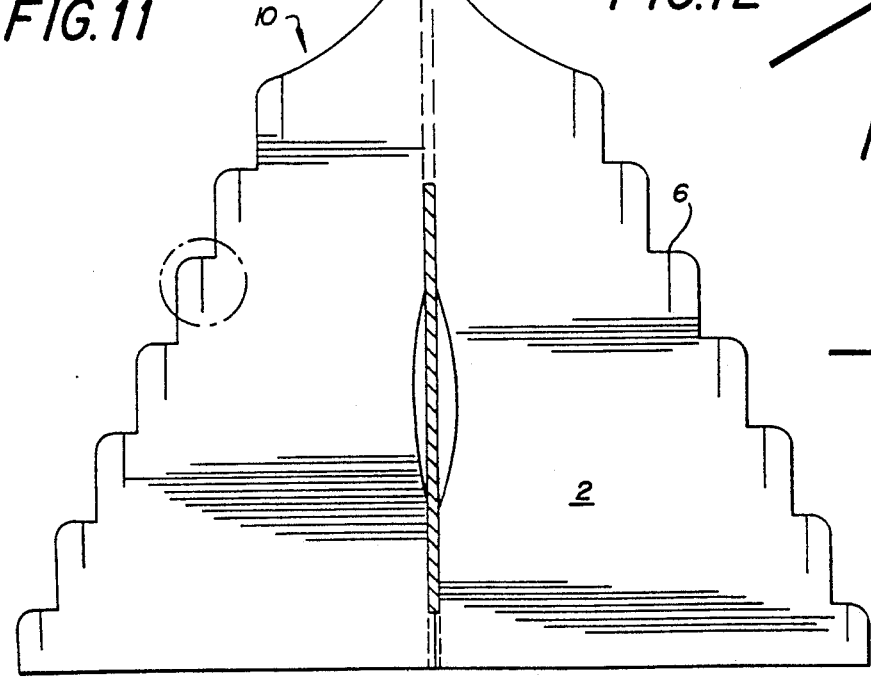
FIG. 10 is a sectional view of a holder according to the present invention wherein a bottom element is shown in section.

In the embodiment shown in FIG. 14, the respective interfitting members comprise a card carrying portion 2 and a support portion 4. The support interfitting member 4 is positioned on one face of the card carrying portion, and only provides the third dimension to the major card carrying portion 2 for support purposes.

Figure 15:
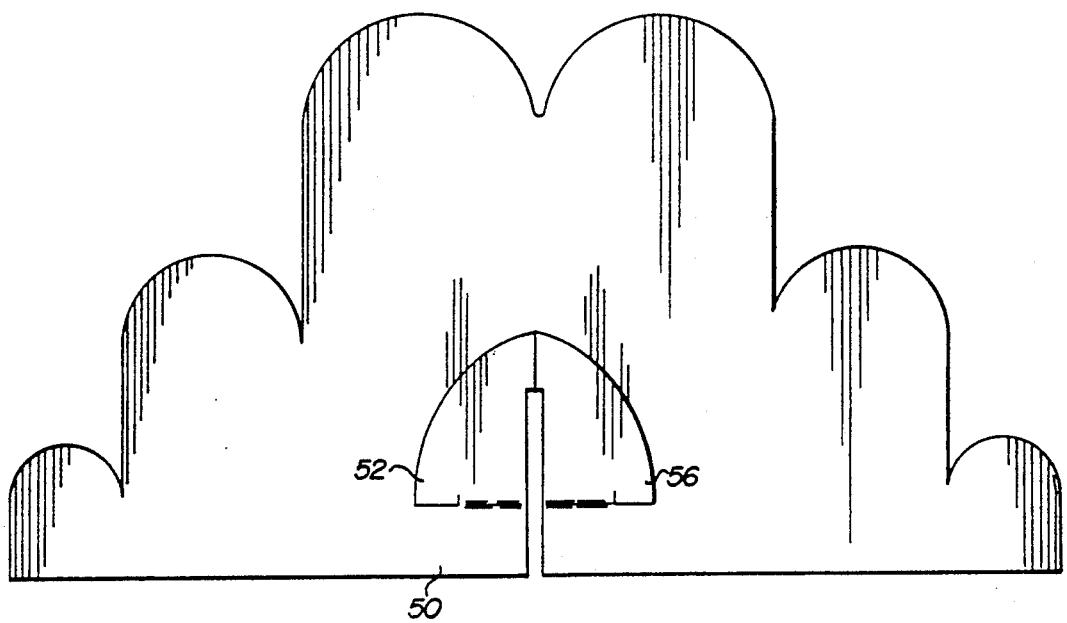
FIG. 15 is an elevational view of a top element of an alternative embodiment of the present invention which includes a fold lock to hold the interfitting elements in fixed relative position.
Figure 17:
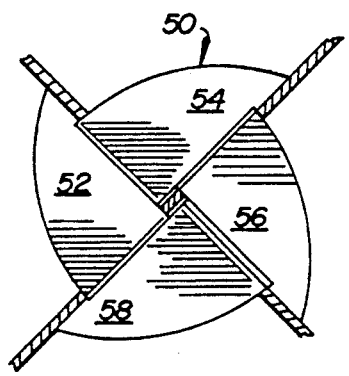
FIG. 17 is a sectional view of the card holder of FIG. 16 along section AA.
Figure 16:
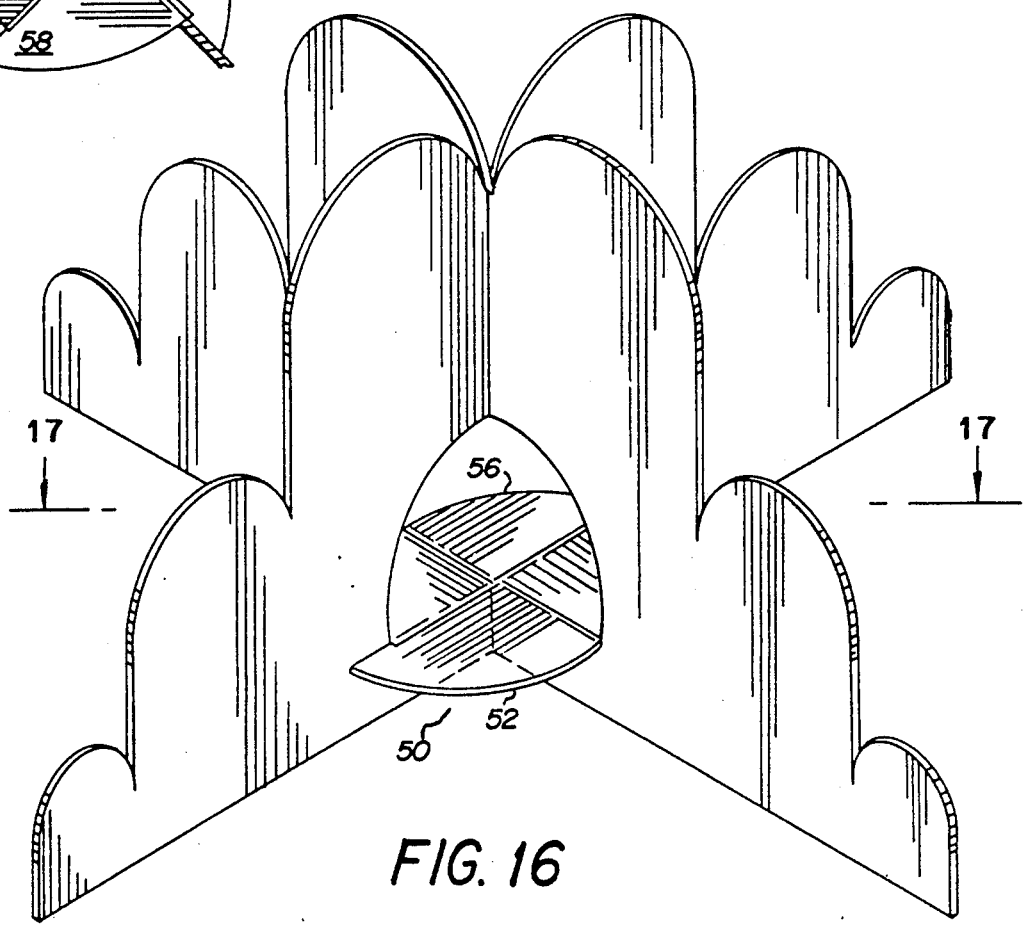
FIG. 16 is a perspective view of a card holder equipped with a lock between the interfitting members according to the present invention.

In the embodiment shown in FIGS. 15-17, the interfitting members include a locking system 50. The locking system shown comprises a series of fold down tabs 52, 54, 56, and 58 which each fold along and against the side of an adjacent interfitting member. In this manner, the relative positioning of the interfitting members to form a stable platform is assured.

Although the locking system shown is well suited to cardboard, or other repeatedly foldable sheet material, other locking systems can be used, i.e., a clip or other fastener connecting between the interfitting members. The function of the lock being directed to maintaining the stable geometric relationship between the interfitting members.

The choices of materials for the holder 10 can be according to the desired use and price range of the device. Basically, any comparatively stiff sheet material will suffice. For purposes of creating an inexpensive holder for single time use, construction paper would suffice. For purposes of creating a seasonally used holder which is repeatedly used over a long period of time, sheet metal or sheet plastic of a decorative nature would suffice. The sheet materials may, of course, be embossed with any decorative coloration, logo, message, as desired. The sheet materials may also take on any desired shape in profile, i.e., waves, curves, etc., as long as the respective members include cooperating slots to form a stable three dimensional structure.

While the foregoing description is directed to the preferred embodiments of the holder according to the present invention, the description is not intended to limit the scope of the invention in any manner. Rather, the scope of the invention is set forth in the below listed claims.

What we claim is:

1. A free standing holder, comprising:
   at least two interfitting sheet members which each includes a cooperating slot, said interfitting members being connected by said cooperating slots in a scissors manner to form a three dimensional structure which presents a network of edges to an underlying support surface on which the three dimensional structure is placed, wherein said network of edges prevents said three dimensional structure from toppling;
   locking means for holding said interfitted members in a fixed relative configuration;
   each of said interfitting sheet members also including a plurality of slots along extended marginal stepped edges thereof for holding selected articles for presentation purposes.

2. A holder as in claim 1 wherein:
   said three dimensional structure includes additional interfitting members including cooperating slots for connecting said interfitting members one to the other in a consecutive manner.

3. A holder as in claim 1 wherein:
   said interfitting sheet members are comprised of cardboard.

4. A holder as in claim 1 wherein:
   said interfitting members are comprised of sheet metal.

5. A holder as in claim 1 wherein:
   said interfitting members are comprised of sheet plastic.

6. A holder as in claim 1, further comprising:
   fastening means located at an upper end of said three dimensional structure for fastening decorations thereto.

7. A holder as in claim 1, wherein:
   said locking means comprises a fold down tab on at least one of said interfitting members, said fold down tab folding along and against a side of an adjacent interfitted member thereby maintaining the relative angular positioning of said interfitted members.

8. A holder as in claim 1, wherein each of the interfitting members extends in a substantially vertical direction and wherein the holding slots on each extended marginal stepped edge of the interfitting members are located at different vertical positions.

9. A holder as in claim 1, wherein the marginal stepped edges of the interfitting members converge towards an apex distal from the underlying support surface.

10. A free standing holder, comprising:
    a first sheet member having a pair of side edges connected by a bottom edge and provided with a first slot; and
    a second sheet member having a pair of side edges connected by a bottom edge and provided with a second slot;
    wherein the sheet members are connected together in a scissors manner such that a portion of the first sheet member is received within the second slot and a portion of the second sheet member is received within the first slot, so as to produce a three dimensional structure,
    wherein the three dimensional structure comprises a network of bottom edges formed by the bottom edges of the first and second sheet members for contacting an underlying surface upon which the holder is placed and which define a bottom of the holder, and a plurality of stepped support edges formed by the side edges of the first and second sheet members and extending upwardly from the bottom of the holder, wherein each of the plurality of stepped support edges comprises at least one support slot for supporting an article above the underlying surface for presentation purposes, wherein the holder further comprises locking means for holding said first and second sheet members in a fixed relative configuration.

11. A holder as in claim 10, wherein each of the plurality of stepped support edges comprises a plurality of the support slots.

12. A holder as in claim 11, wherein each of the plurality of support slots on each of the plurality of stepped support edges is located at a different vertical position above the bottom of the holder.

13. A holder as in claim 10, wherein the side edges of each of the first and second sheet members converge towards each other in a direction away from the respective bottom edge, so that the stepped support edges of the three dimensional structure converge towards an apex distal from the bottom of the holder.

14. A holder as in claim 10, wherein at least a portion of the three dimensional structure forms a Christmas tree shape.

15. A holder as in claim 10, wherein the locking means comprises at least one fold down tab on at least one of the first and second sheet members, the fold down tab or tabs of the or each sheet member folding along and against a side of an adjacent sheet member so as to maintain a relative angular configuration of the sheet members.

* * * * *